Jan. 27, 1970        H. H. HOLLY        3,491,401

MOLDING APPARATUS WITH MIXING CHAMBER

Filed June 21, 1967        2 Sheets-Sheet 1

INVENTOR.
HARRY H. HOLLY
BY Hofgren, Wegner, Allen, Stellman & McCord.
ATTORNEYS.

Jan. 27, 1970  H. H. HOLLY  3,491,401

MOLDING APPARATUS WITH MIXING CHAMBER

Filed June 21, 1967  2 Sheets-Sheet 2

United States Patent Office 3,491,401
Patented Jan. 27, 1970

3,491,401
MOLDING APPARATUS WITH MIXING CHAMBER
Harry H. Holly, Olympia Fields, Ill., assignor to Hollymatic Corporation, a corporation of Illinois
Filed June 21, 1967, Ser. No. 647,666
Int. Cl. A22c 7/00
U.S. Cl. 17—32                                                   7 Claims

ABSTRACT OF THE DISCLOSURE

Apparatus for molding generally round articles such as patties of a fiber containing plastic food material such as ground meat, fish and similar food products to produce a superior structure that shrinks substantially uniformly during cooking and the like processing so that the generally round shape is substantially maintained through the cooking and other processing.

CROSS REFERENCE

A molding apparatus of the same general type as disclosed herein and disclosing other elements of the apparatus in detail is disclosed and claimed in my U.S. Patent 3,293,688 and is assigned to the same assignee as the present application.

In this prior patent there is disclosed a supply means for providing a supply of plastic material having an exit opening through which the material which is customarily a food material may be forced, feeder means for moving the material to and through the exit opening under pressure, a mold such as a reciprocable mold plate with a mold cavity therein communicating with the exit opening to receive the plastic material under pressure and sealing means such as upper and lower parallel plates between which the mold plate is reciprocated and closing the sides of the mold except for that portion of one side coinciding with the exit opening when the mold cavity is in filling position. The mold, specifically the mold plate, is movable from a position where the cavity receives the material through the filling opening under pressure to form the article to the shape of the cavity and a position where the cavity is out of communication with the exit opening and on its way to a place of removel of the shaped article.

In molding patties that are circular or round in shape and that contain fibers, such as food product patties, it often happens that during cooking, freezing and other processing the round patty does not shrink uniformly but loses its round shape so that at the end of the cooking or the like the patty will have a random out-of-round shape.

In the above Patent 3,293,688 this condition is believed to be greatly lessened by applying a heavy precompression to the plastic material just prior to the time the mold opening is in communication with the exit opening. This appears to cause a random intermingling of the fibers in the mold so that the shrinkage during cooking is substantially uniform. In the apparatus of this invention this high precompression is not required as the injection can be later in the cycle yet the shrinkage during cooking or other processing is remarkably uniform.

One embodiment of the invention is illustrated in the accompanying drawings of which:

Figure 1:
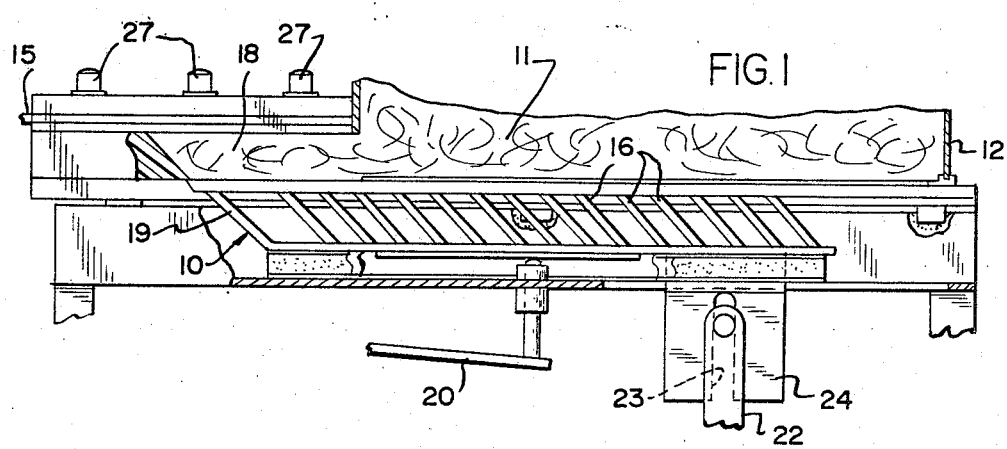
FIGURE 1 is a fragmentary side elevational view partially in section of a molding device similar to the one disclosed more fully in my above patent and incorporating this invention.

As is explained in the above patent, feeder means 10 are employed to move the plastic material such as the ground meat 11 from a supply means such as a supply hopper 12 through an axit opening 13 leading from the supply means into a mold cavity 14 in a reciprocable mold plate 15.

Figure 2:
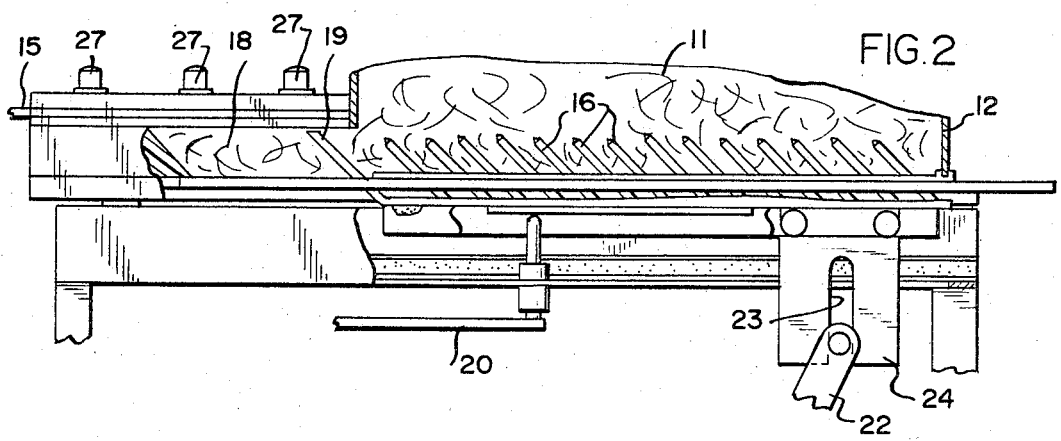
FIGURE 2 is a view similar to FIGURE 1 but showing the feeder means in position remote from the mold cavity preparatory to filling the cavity in the mold plate.

In the accompanying drawings only enough of the molding apparatus structure is shown to illustrate the invention. Thus, the feeder means 10 as is explained in detail in the above patent is essentially a four motion feeder means that comprises forwardly sloped spaced pins 16 mounted on a bottom plate 17 and sloped forwardly toward the front of the supply hopper 12 that includes the forwardly extending passage means or tunnel 18. At the front of the plate 17 forwardly of the pins 16 there is provided a forwardly sloped feeder bar 19 that extends, when in the feeding position of FIGURES 2 and 3, substantially completely across the generally rectangular cross sectioned passage means 18.

In the first of the four motions, the feeder means 10 is lowered to the position shown in FIGURE 1 where it is beneath the supply hopper 12 by lowering a lever 20 such as with a cam (not shown) operating on a cam follower 21. Then, in the second motion, the feeder means 10 is retracted to a position below the hopper 12 and below its position shown in FIGURE 2. In the third motion, it is raised to the position shown in FIGURE 2 by the lever 20 where the pins 16 and feeder bar 19 are within the bottom of the hopper 12 and the feeder bar 19 is at the rear of the passage means 18. Then, in the fourth motion, the feeder means 10 is moved forwardly by a lever 22 engaging a slot 23 in a downwardly extending drive bar 24 so that the feeder bar 19 will force the plastic material such as the ground meat forwardly in the passage means 18 and through the exit opening 13 into the mold cavity 14.

Figure 3:
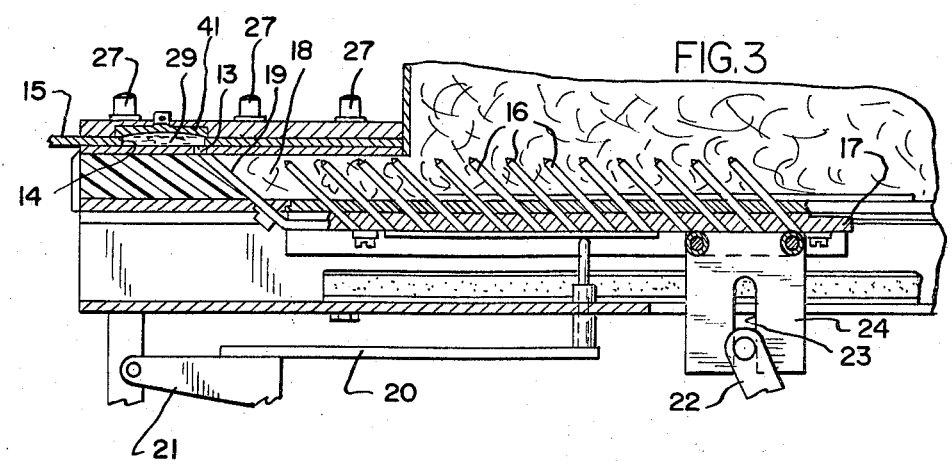
FIGURE 3 is a view similar to FIGURES 1 and 2 but showing the forward end of the apparatus in vertical section and with the feeder means at the end of its feeding movement.
Figure 5:
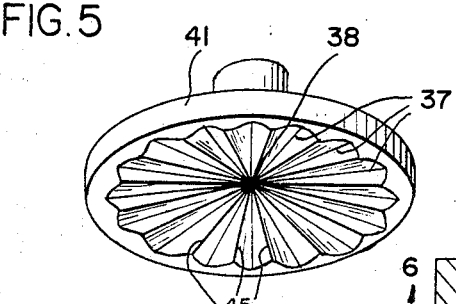
FIGURE 5 is a perspective view of a portion of a top plate of the apparatus that is located above the mold cavity.
Figure 4:
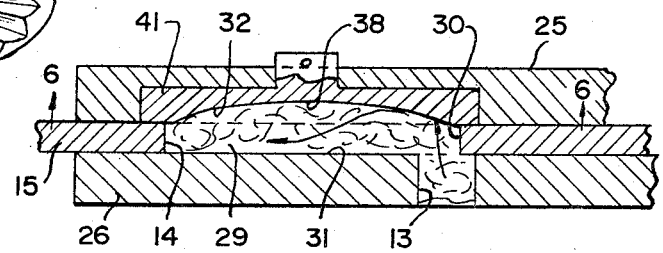
FIGURE 4 is an enlarged fragmentary sectional view of a portion of the apparatus shown in FIGURE 3.

As is shown most clearly in FIGURES 3 and 4 the mold plate 15 is reciprocated between plates 25 and 26 with these two plates held in this assembled relationship by spaced bolts 27. As is true in apparatus of this type, the reciprocating movement of the mold plate 15 is in timed relationship to the movement of the feeder means 10 so that the feeder means moves forwardly to coincide with the time the mold cavity 14 is in communication with the exit opening 13 from the supply means, here exemplified in the hopper 12 and passage means 18. When this occurs, the plastic material such as the meat is forced upwardly through the exit opening 13 into the mold cavity 14 to form the molded article or meat patty 29 having the shape of the mold plate cavity 14. After the cavity is filled the mold plate is moved to the left to a place of ejection of the formed patty 29.

All of the structure disclosed and described above is a part of the entire apparatus disclosed and claimed in my above mentioned prior U.S. Patent 3,293,688.

As can be seen in greater detail in FIGURE 4, the mold cavity 14 which forms the patty 29 is generally cylindrical with a circular side wall 30 and a bottom end wall 31 and top end wall 32. When the mold plate 15 is in position between the guide plates 25 and 26 these end walls will of course be determined by the adjacent portions of these plates.

When feeding pressure is applied to the plastic material in the manner previously described the material such as the ground meat of the illustrated embodiment is forced in a stream through the exit opening 13 and into the circular or cylindrical mold cavity 14.

Figure 6:
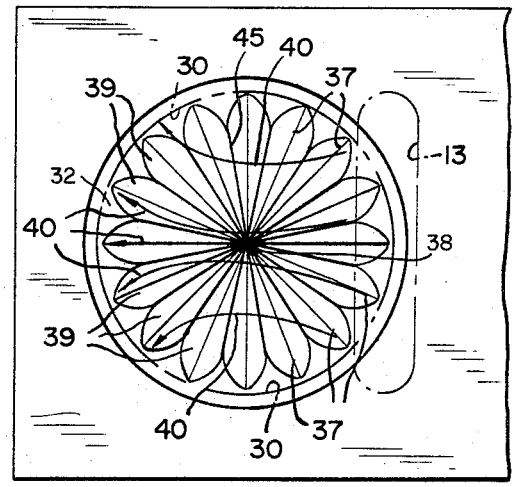
FIGURE 6 is a horizontal sectional view taken along the line 6—6 of FIGURE 4.
Figure 7:
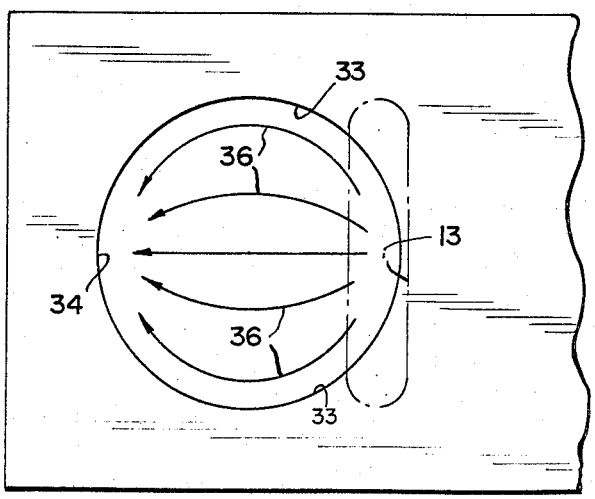
FIGURE 7 is a diagrammatic view similar to FIGURE 6 but showing the flow lines of the ground meat or other plastic material entering an ordinary cylindrical cavity that does not include the structure of this invention.

When the mold cavity has flat top and bottom walls the flow of the ground meat into the mold cavity fans out along the cavity side wall portions 33 that are nearest the opening 13 and then the stream is directed back toward the opposite end portion 34 of the cavity so that the flow into the cavity may be generalized by the curved arrows 36 of FIGURE 7. Unless considerable pressure is applied by the feeder bar 19 to the ground meat the patty in the region of the side wall portions 33 that flare outwardly from the fill opening 13; will be less dense and the fibers will be more nearly parallel to each other than is the case with the patty portion that is near the opposite wall 34. The result is that the patty during cooking or other processing does not maintain its circular appearance but shrinks out-of-round unless the pressure exerted by the feeder bar is considerable so as to result in substantially uniform density of the patty at substantially all edge portions and with a high degree of intermingling of the fibers brought about by this high filling pressure. In the structure of the present invention sloped guide means are provided in at least one of the end walls, here shown as the top end wall 32, but with the guide means being sloped across the stream as exemplified by the arrows 36 of FIGURE 7 showing the flow of meat into an ordinary cylindrical cavity with a flat top and bottom, as previously explained. In the preferred construction, as shown in the drawings especially at FIGURE 6 the guide means is in the form of radiating spaced grooves 37 in the top end wall 32 with these grooves generally radiating from the center 38 of this top wall 32 and with adjacent grooves joining along a line 45.

With this construction where the plastic material enters the mold cavity 14 adjacent the side wall portion 30 from the opening 13, the grooves 37 adjacent the opening 13 are sloped to converge away from the exit opening 13 and away from the side wall 30 of the mold cavity toward the center 38 as shown in FIGURE 6. Then, the terminal regions of the side wall that are spaced from the opening 13 and following the initial region of the side wall (at the left side of FIGURE 6) are sloped from the center 38 to diverge toward the side wall 30, as illustrated by the corresponding grooves 39 as shown in FIGURE 6. The result of this is that the direction of flow of the plastic material filling the mold opening 14 is now changed from that of the prior structures as generally indicated by the arrows 36 in FIGURE 7, where the grooves are not present, to a mixing action and a direction of flow illustrated diagrammatically by the arrows 40 in FIGURE 6. Because the grooves 37 and 39 are in general across what would be the normal stream of the flow 36 without these grooves as shown in FIGURE 7, there is a general mixing and intermingling action so that even without precompression the resulting patty is more uniform and shrinkage is such that the patty maintains its round shape even during cooking.

In the illustrated embodiment the grooves 37 and 39 are formed on the bottom surface of an insert 41 in the top back-up plate 25. This was merely done in this embodiment for convenience of manufacture. It is obvious that the insert plate 41 could be omitted and the radiating grooves formed directly in the top plate 25.

Although the radiating grooves in the chamber containing the same will be filled with the plastic material along with the patty shaped cavity 14 in the mold plate, when the mold plate is moved to discharge position for removing the patty the top of the patty will of course be wiped smooth by the flat adjacent surface of adjacent cover plate 25 so that the resulting patty will have parallel flat top and bottom surfaces. The plastic material remaining in the grooves will be dislodged therefrom and mixed with incoming plastic material on the next molding of the next patty.

Having described my invention as related to the embodiment shown in the acompanying drawings, it is my intention that the invention be not limited by any of the details of description, unless otherwise specified, but rather be construed broadly within its spirit and scope as set out in the accompanying claims.

I claim:

1. Apparatus for molding a round patty of plastic food material that shrinks during cooking and the like, comprising: supply means for providing a supply of plastic material having an exit opening; a mold having a round mold cavity with a circular side wall, said cavity being adapted to communicate with said exit opening to receive said plastic material therefrom for filling of said cavity; a closure member at one side of said mold during said communicating; means for applying pressure to said plastic material to force the material in a stream from the exterior of said cavity through said exit opening into said cavity; and angled guide means in said closure member generally angled across said stream for intermixing of said plastic material in said cavity.

2. The apparatus of claim 1 where said opening is smaller than said cavity with the result that said material fans out from said opening into said cavity.

3. The apparatus of claim 2 wherein said opening is located adjacent said side wall during said filling, and said guide means are sloped from said exit opening away from said side wall in the initial region adjacent said opening.

4 The apparatus of claim 2 wherein said opening is located adjacent said side wall during said filling, and said guide means are sloped from said exit opening away from said side wall in the initial region adjacent said opening and then toward said side wall in the terminal region spaced from said opening and following said initial region.

5. The apparatus of claim 1 wherein said opening is located adjacent said side wall during said filling, and said guide means is in the form of spaced grooves in said end wall angularly arranged with respect to each other and to said opening.

6. The apparatus of claim 5 wherein said opening is located adjacent said side wall during said filling, and said guide means are sloped from said exit opening away from said side wall in the initial region adjacent said opening and then toward said side wall in the terminal region spaced from said opening and following said initial region.

7. The apparatus of claim 6 wherein said grooves extend generally radially from approximately the center of said cavity side wall.

References Cited

UNITED STATES PATENTS

| | | | |
|---|---|---|---|
| 1,648,834 | 11/1927 | Wallace | 17—32 |
| 1,757,447 | 5/1930 | Comstock | 17—32 |
| 2,219,889 | 10/1940 | Federighi | 17—32 |
| 2,413,046 | 12/1946 | Holly | 17—32 |
| 2,820,247 | 1/1958 | Michaud | 17—32 |

LUCIE H. LAUDENSLAGER, Primary Examiner